United States Patent
Ramamurti

(10) Patent No.: US 7,881,960 B2
(45) Date of Patent: Feb. 1, 2011

(54) VALUE ANALYSIS AND VALUE ADDED CONCOCTION OF A BEVERAGE IN A NETWORK ENVIRONMENT OF THE BEVERAGE

(75) Inventor: Rajkumar Ramamurti, Mountain View, CA (US)

(73) Assignee: Wine Societies, Inc., Mountain View, CA (US)

( * ) Notice: Subject to any disclaimer, the term of this patent is extended or adjusted under 35 U.S.C. 154(b) by 881 days.

(21) Appl. No.: 11/607,202

(22) Filed: Nov. 30, 2006

(65) Prior Publication Data

US 2008/0133318 A1 Jun. 5, 2008

(51) Int. Cl.
*G06F 17/00* (2006.01)
(52) U.S. Cl. ..................... 705/10; 705/14.16
(58) Field of Classification Search .................. 705/10, 705/14.16
See application file for complete search history.

(56) References Cited

U.S. PATENT DOCUMENTS

| | | | |
|---|---|---|---|
| 2002/0029184 A1 | 3/2002 | Reiner | |
| 2002/0046060 A1 | 4/2002 | Hoskyns et al. | |
| 2002/0062236 A1* | 5/2002 | Murashita et al. | 705/5 |
| 2002/0111899 A1 | 8/2002 | Veltre et al. | |
| 2004/0217124 A1 | 11/2004 | Crisp, III | |
| 2004/0222136 A1 | 11/2004 | Popp et al. | |
| 2005/0230417 A1 | 10/2005 | Knepler et al. | |
| 2006/0080349 A1 | 4/2006 | Thompson | |
| 2006/0085292 A1 | 4/2006 | Lafay | |
| 2008/0004973 A1* | 1/2008 | Rothschild | 705/26 |
| 2009/0043719 A1* | 2/2009 | Hall et al. | 706/13 |

* cited by examiner

*Primary Examiner*—Thomas Dixon
(74) *Attorney, Agent, or Firm*—Raj Abhyanker, P.C.

(57) ABSTRACT

A method and/or a system for value analysis and value added concoction of a beverage in a network environment of the beverage is disclosed. In one embodiment, a method includes acquiring a set of opinion data corresponding to a set of attributes defining a beverage through users of a network having a propensity to identify themselves with the beverage using an incentive promoting the beverage to the users. The method also includes applying an algorithm to transform the set of opinion data to factors which affect a market value of the beverage, and determining the market value of the beverage as a function of one or more of the factors. In another embodiment, a method includes generating a formula data to enable a registered user to concoct a variation of a particular type of beverage accentuating one or more intrinsic qualities of the particular type of beverage.

1 Claim, 13 Drawing Sheets

US 7,881,960 B2

VALUE ANALYSIS AND VALUE ADDED CONCOCTION OF A BEVERAGE IN A NETWORK ENVIRONMENT OF THE BEVERAGE

FIELD OF TECHNOLOGY

This disclosure relates generally to the technical fields of system and method of value analysis and value added concoction of a beverage in a network environment of the beverage.

BACKGROUND

A beverage (e.g., which may be largely composed of water) may be a drink specifically prepared for human consumption. The beverage may include both an alcoholic beverage (e.g., a wine, a beer, a vodka, etc.) and a non-alcoholic beverage (e.g., a cola, a juice, a shake, etc.). There may be a large number of companies (e.g., and/or individuals) producing at least one type of the beverage.

Unlike the companies, the individuals may have some difficulty to concoct a beverage product on their own because the individuals may lack means (e.g., an expertise, a resource, a capital, a facility, etc.) necessary to prepare the beverage product. In addition, the individuals may also encounter problems in obtaining feedbacks from potential consumers of the beverage product (e.g., thus preventing the individuals from exploiting a commercial opportunity with the beverage product).

Among the large number of companies, a company may encounter a challenge when the company launches a new beverage product (e.g., which may contain ingredients slightly different from an existing beverage product and/or which may be an entirely new type of beverage product). For the company, it may be essential to obtain meaningful responses reacting to the new beverage product in regards to features (e.g., a price, a quality, a design of a container, and other features) of the new beverage product. Among the features of the new beverage product, the price may be set by the company based on an evaluation of the company on a target market. However, the price may not meet expectations of consumers of the new product (e.g., thus failing to draw interests of the consumers in the new product).

In another context, the price may be set by experts (e.g., a beverage tasting expert and/or a market researcher) hired by the company. However, hiring the experts may incur an extra cost for the company and/or may not guarantee a validity of findings by the experts when the experts (e.g., hired to do the findings) are few in numbers. In yet another context, some members of the general public may be invited to participate in the evaluation of the new product. Nevertheless, the evaluation done by the some members may not be accurate because the some members may not exert enough effort to do the evaluation (e.g., especially when the some members do not care for the new beverage product) and/or may lack an expertise to properly evaluate the new beverage product.

SUMMARY OF THE DISCLOSURE

A method and/or a system of value analysis and value added concoction of a beverage in a network environment of the beverage is disclosed.

In one aspect, a method includes acquiring a set of opinion data corresponding to a set of attributes (e.g., which include a year, a winery, a region, a climate, a barrel, a maker, a pairing food, a cost, a best occasion to consume, a gender, an occupation, an income, an age, an aroma, a taste, an after-taste, and/or a body when the beverage is a wine) defining a beverage through users of a network having a propensity to identify themselves with the beverage using an incentive promoting the beverage to the users. The method also includes applying an algorithm to transform the set of opinion data to factors which affect a market value of the beverage, and determining the market value of the beverage as a function of one or more of the factors.

The method may include rendering a future market value of the beverage based on one or more of the factors. The method may also include connecting a first registered user of the network and a second registered user of the network when a first opinion data of the first registered user matches with a second opinion data of the second registered user beyond a threshold value. The method may further include communicating a first profile data of the first registered user to the second registered user and a second profile data of the second registered user to the first registered user for display.

In addition, the method may include communicating an invitation data to an unregistered user acquainted by a registered user, and adding the unregistered user to a database of the network through processing a new profile data of the unregistered user when the unregistered user communicates an acceptance data to the registered user.

Moreover, the method may include selectively recommending to the users of the network wine-related products which include a winery tour, a restaurant dining, a lodging, a spa, a music file, and/or an artwork based on the set of opinion data. The method may further include rendering a consumption data of the wine based on the one or more of the factors. Furthermore, the method may include providing a financial reward to any one of the users when the any one of the users performs at least one of posting a blog related to the wine and the wine-related products, rating the wine and the wine-related products, and inviting the unregistered user to join the network.

In another aspect, a method includes rendering a set of opinion data (e.g., which may be analyzed to calculate a market value of a variation of a particular type of beverage as a function of one or more intrinsic qualities of the particular type of beverage) by users of a network having a propensity to identify themselves with the particular type of beverage in regard to the one or more intrinsic qualities of the particular type of beverage.

The method also includes generating a formula data to enable a registered user to concoct the variation of the particular type of beverage accentuating the one or more intrinsic qualities (e.g., which may include at least one of a taste, an after-taste, a body, and an aroma when the particular type of beverage is a type of wine) of the particular type of beverage. In addition, the method includes evaluating the variation of the particular type of beverage based on a different set of opinion data assigned by the users of the network using an incentive promoting the particular type of beverage to the users.

The method may also include rendering an instruction data to the registered user as to how to concoct the particular type of wine (e.g., where the instruction data to include mixing different types of wine at a choosing of the registered user to make a meritage, deciding how long to age the meritage, and/or selecting an environment to store the meritage). The method may further include providing products of a particular winery to the users (e.g., where the products may include a wine list of the particular winery, a winery tour offered by the particular winery, and/or wine-related products offered by the particular winery). In addition, the method may include connecting the registered user with the particular winery to concoct the variation of the particular type of wine at the particular winery based on a customized instruction data of the registered user.

In yet another aspect, a system includes one or more beverage society modules with each beverage society module to have a network of users having a propensity to identify themselves with a beverage unique to the network. The system further includes a community module to connect two or more users of the network when opinion data of the two or more users regarding one or more attributes of the beverage are similar to each other beyond a threshold value. In addition, the system includes a valuation module to perform inviting the two or more users to assign value data to the beverage with respect to the one or more attributes and/or analyzing the value data to calculate a price of the beverage.

The system of claim may further include a collaboration module to enable a user to make a particular type of beverage through rendering to the user a formula for the particular type of beverage and a set of instructions to make the particular type of beverage. The system may also include a vendor module to communicate a set of offerings to the two or more users based on the opinion data of the two users. Moreover, the system may include an advertiser module to render an advertisement to the two or more users when the advertisement is associated with the one or more attributes of the beverage.

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
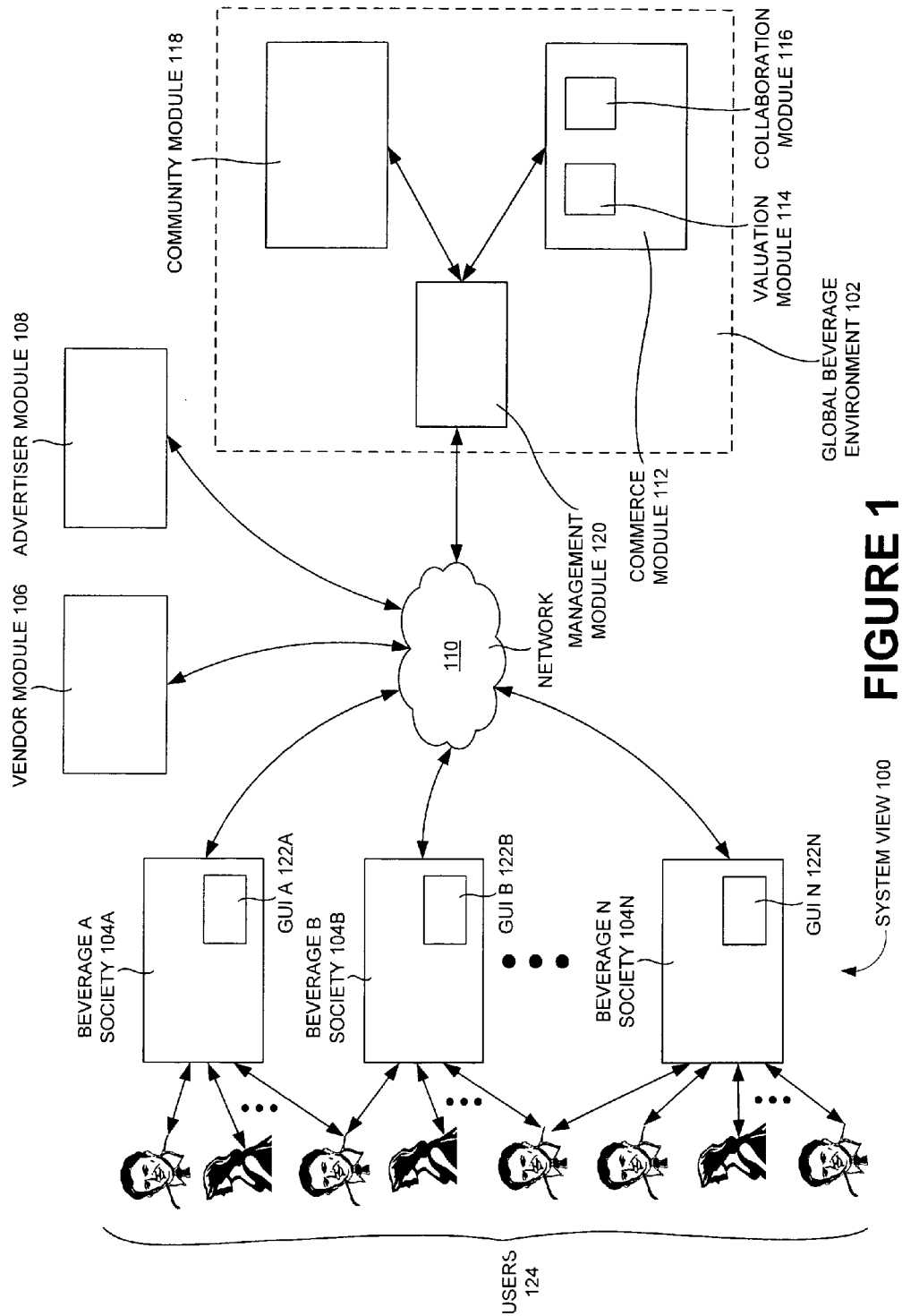
FIG. 1 is a system diagram of a global beverage environment connected to one or more beverage societies through a network, according to one embodiment.

Other features of the present embodiments will be apparent from the accompanying drawings and from the detailed description that follows.

DETAILED DESCRIPTION

A method and/or a system of value analysis and value added concoction of a beverage in a network environment of the beverage is/are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method includes acquiring a set of opinion data (e.g., opinion data 314 of FIG. 3) corresponding to a set of attributes (e.g., of an attribute library 312) defining a beverage through users (e.g., users 124 of FIG. 1) of a network having a propensity to identify themselves with the beverage using an incentive (e.g., through an incentive module 202 of FIG. 2) promoting the beverage to the users. The method also includes applying an algorithm (e.g., a valuation module 114) to transform the set of opinion data to factors which affect a market value of the beverage, and determining the market value of the beverage as a function of one or more of the factors.

In another embodiment, a method includes rendering a set of opinion data by users of a network having a propensity to identify themselves with a particular type of beverage in regard to one or more intrinsic qualities of the particular type of beverage. The method also includes generating a formula data (e.g., through a collaboration module 116 of FIG. 1) to enable a registered user to concoct a variation of the particular type of beverage accentuating one or more intrinsic qualities of the particular type of beverage. In addition, the method includes evaluating the variation of the particular type of beverage based on a different set of opinion data assigned by the users of the network using an incentive promoting the particular type of beverage to the users.

In yet another embodiment, a system includes a plurality of beverage society modules with each beverage society module (e.g., a beverage society 104 of FIG. 1) to have a network of users having a propensity to identify themselves with a beverage unique to the network. The system further includes a community module (e.g., a community module 118) to connect two or more users of the network when opinion data of the two or more users regarding one or more attributes of the beverage are similar to each other beyond a threshold value. In addition, the system includes a valuation module to perform inviting the two or more users to assign value data to the beverage with respect to the one or more attributes and/or analyzing the value data to calculate a price of the beverage.

Also, the method may be in a form of a machine-readable medium embodying a set of instructions that, when executed by a machine, cause the machine to perform any method disclosed herein. It will be appreciated that the various embodiments discussed herein may/may not be the same embodiment, and may be grouped into various other embodiments not explicitly disclosed herein. It will be appreciated that the various embodiments discussed herein may/may not be the same embodiment, and may be grouped into various other embodiments not explicitly disclosed herein.

FIG. 1 is a system diagram of a global beverage environment 102 connected to a beverage society 104 through a network 110, according to one embodiment.

Particularly, in FIG. 1 illustrates a global beverage environment 102, a beverage society 104, a vendor module 106, an advertiser module 108, a network 110, a commerce module 112, a valuation module 114, a collaboration module 116, a community module 118, a management module 120, a graphic user interface (GUI) 122, and/or users 124. The global beverage environment 102 may be a server (e.g., both hardware and/or software of an entire computer system) and/or just a software that performs a service.

The beverage society 104 (e.g., a wine society, a beer society, a cognac society, etc. which may be a client of the global beverage environment 102) may be a software and/or hardware which enables the users 124 to form the network 110 while subscribing to a variety of services and/or contents offered by the beverage society 104. The vendor module 106 may be a software and/or hardware application which enables vendors catering to one and/or more of the beverage societies 104 to connect with the users 124 through the network 110. The advertiser module 108 may be a soft and/or hardware application which enables advertisers catering to one and/or more of the beverage societies 104 to connect with the vendors and/or the users 124 through the network 110.

The network 110 (e.g., wired and/or wireless) may include a network operating system in client and server machine, cables connecting them, and all supporting hardware in between the client and server machines, such as bridges, routers and/or switches. The commerce module 112 may be a hardware and/or software component that interacts with a larger system (e.g., the global beverage environment 102) to implement a business application (e.g., where the software component (e.g., a program module) may come in a form of a file and/or may typically handle a specific task within the larger system, whereas the hardware component may be a unit that often plugs into a main system).

The valuation module 114 may be a hardware and/or software component that interacts with the commerce module 112 to assess (e.g., a value and/or a quality of) a beverage. The collaboration module 116 may be a hardware and/or software component that interacts with the commerce module 112 to enable a user (e.g., any one of the users 124) of one and/or more of the beverage society 104 to make a beverage. The community (e.g., social, professional, etc.) module 118 may interact with the beverage society 104 to build a network of the users 124. The management module 120 may administer transactions of the users 124 and/or vendors through the beverage society 104. The gui 122 may be a graphics-based user interface that incorporates movable windows, icons and/or a mouse. The users 124 may be registered and/or unregistered users of the beverage society 104.

For example, as illustrated in FIG. 1, the users 124 (e.g., registered and/or unregistered) may access a beverage society 104 of their choice when the users 124 have a propensity to a particular type of beverage which the beverage society 104 represents. The beverage society 104 may communicate with the global beverage environment 102 through the network 110. In the global beverage environment 102, the commerce module 112, and the community module 118, and the management module 120 may interact with each other to support services offered through the beverage society 104.

The vendor module 106 may obtain necessary information from the global beverage environment 102 and/or provide a number of services and/or products to the users 124 of the beverage society 104. The advertiser module 108 may obtain information of a target group through accessing the global beverage environment 102 through the network 10, and/or place one and/or more advertisements to the target group.

Furthermore, each one of the beverage society module 104 may have a network of users having a propensity to identify themselves with a beverage unique to the network. At least two users of the network 110 may be connected when opinion data of the at least two users regarding at least one attribute of the beverage are similar to each other beyond a threshold value (e.g., which may be set by an administrator of the global beverage environment 102). The valuation module 114 may perform inviting two or more users to assign value data (e.g., percentage value based on a degree of their satisfaction) to the beverage with respect to one or more attributes (e.g., a quality and/or a price) and analyzing the value data to calculate a price of the beverage.

A user may be enabled to make a particular type of beverage through rendering to the user a formula and a set of instructions to make the particular type of beverage using the collaboration module 116. A set of offerings may be communicated by the vendor module 106 to one or more users based on the opinion data of the users. An advertisement may be rendered by the advertiser module 108 to one or more users when the advertisement is associated with one or more attributes of the beverage.

Figure 2:
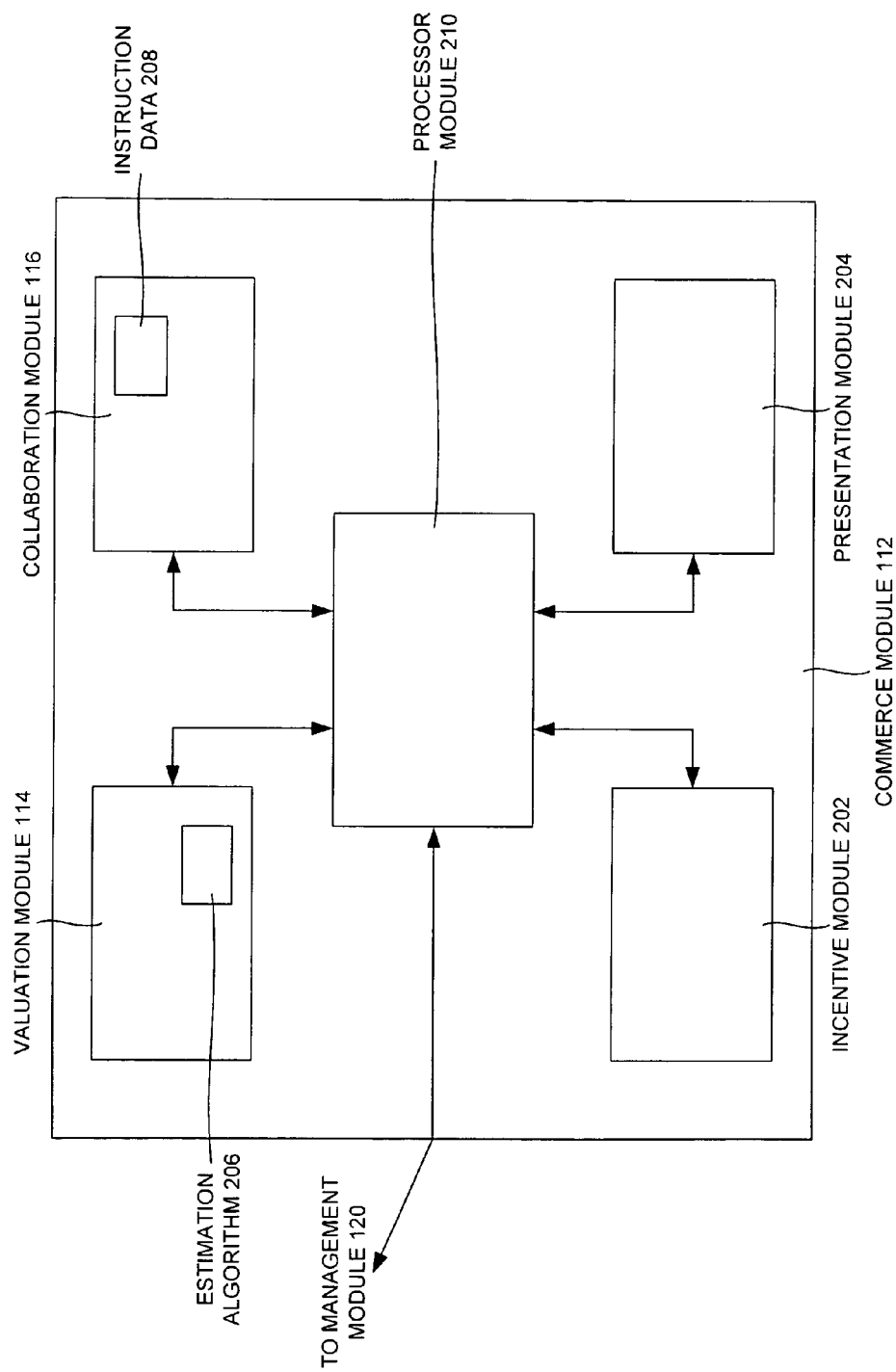
FIG. 2 is an exploded block diagram of the commerce module of FIG. 1, according to one embodiment.

FIG. 2 is an exploded block diagram of the commerce module 112 of FIG. 1, according to one embodiment. Particularly, in FIG. 2 illustrates an incentive module 202, a presentation module 204, an estimation algorithm 206, an instruction data 208, a processor module 210. The incentive module 202 may be used to solicit a participation of the users 124 of the beverage society 104 of FIG. 1 to one or more activities (e.g., events) hosted by the beverage society 104. For instance, the users 124 may be given an incentive in a form of a free beverage, a discount of an item the users 124 purchase, a reward point, and/or a cash price for participating in a wine tasting event (e.g., which may be held to sample reactions of the users 124 in regard to the wine's quality and/or price).

The presentation module 204 may display output data (e.g., based on an analysis) in a variety of formats (e.g., a text, a graph, a picture, a video, etc.). The estimation algorithm 206 may be a set of ordered steps (e.g., with a mathematical formula and/or instructions in a program) for assessing a value (e.g., a quality and/or a price) of a beverage. The instruction data 208 may be a set of data (e.g., which may be uploaded by the administrator of the global beverage environment 102 and/or the beverage society 104, and/or the users 124) which may be used to educate the users 124 and/or to prepare making of a beverage. The process module 210 may be used to control the valuation module 114 of FIG. 1, the collaboration module 116, the incentive module 202, and the presentation module 204 and/or to help those modules interact with the management module 120.

Furthermore, a set of opinion data corresponding to a set of attributes defining a beverage may be acquired through users of a network having a propensity to identify themselves with the beverage (e.g., a wine, a beer, a cola, etc.) using an incentive promoting the beverage to the users. An algorithm (e.g., the estimation algorithm 206) may be applied to transform the set of opinion data to one or more factors which affect a market value of the beverage. The market value of the beverage may be determined as a function of the one or more factors (e.g., a quality of the beverage, an age of the beverage, a label of the beverage, a season, etc.).

A future market value of the beverage may be also rendered (e.g., in text, graph, etc.) based on the one or more factors. Wine-related products which include a winery tour, a restaurant dining, a lodging, a spa, a music file, and/or an artwork may be selectively recommended to the users 124 of the network 110 based on the set of opinion data.

The set of opinion data may be analyzed to calculate the market value of a variation of (e.g., a particular meritage in a wine) the beverage as a function of one or more intrinsic qualities (e.g., an aroma, a body, a taste, and/or an after-taste) of the particular type of beverage (e.g., a red wine). The set of opinion data by users of a network (e.g., the beverage society 104) having a propensity to identify themselves with the particular type of beverage in regard to at least one intrinsic quality of the particular type of beverage may be rendered (e.g., to any user of the network 110 of FIG. 1).

Figure 3:
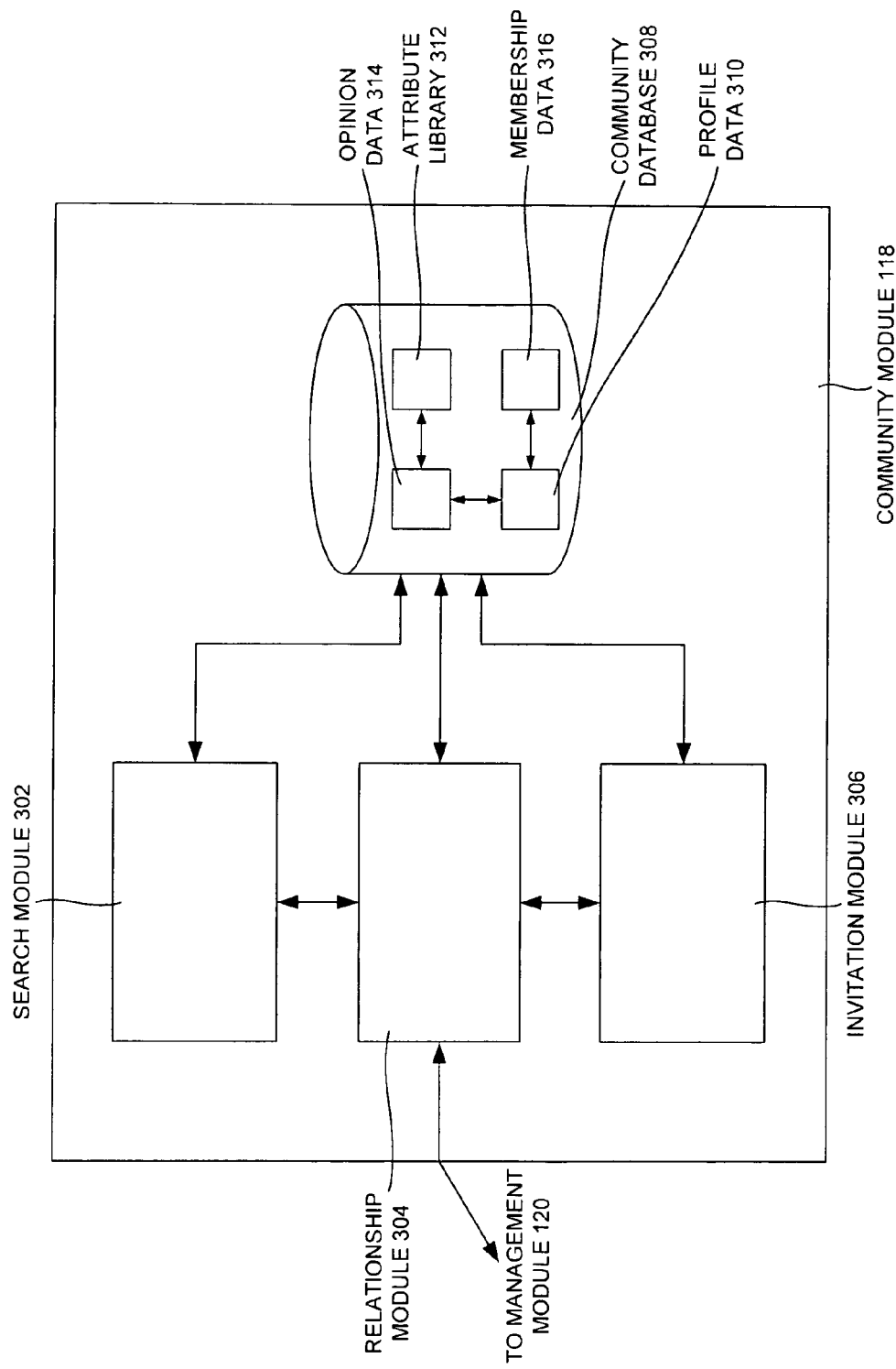
FIG. 3 is an exploded block diagram of the community module of FIG. 1, according to one embodiment.

FIG. 3 is an exploded block diagram of the community module 118 of FIG. 1, according to one embodiment. Particularly, in FIG. 3 illustrates a search module 302, a relationship module 304, an invitation module 306, a community database 308, a profile data 310, an attribute library 312, an opinion data 314, and/or a membership data 316. The search module 302 may support any types of searches that may be conducted by the users 124, vendors of the vendor module 106, and/or advertisers of the advertiser module 108 of FIG. 1.

For instance, the users 124 may search for a list of wine, their prices, and ratings of the users 124 in regard to the list of wine. The users 124 may also seek for a winery, a restaurant, a food pairing, a lodging, a blog, a photo, a music, a video, and an art related to the wine. The users 124 may also look for a friend who may share a similar taste in the wine (e.g., and/or other categories) to form a group (e.g., a club) and/or invite a friend and/or a friend to a society having a propensity toward the wine. In another example embodiment, the vendors and/or the advertisers may search for a target group of users of the beverage society 104 to render their offerings (e.g., a list of products, an advertisement, etc.).

The relationship module 304 may be used to determine a relationship of two users about to be connected (e.g., strangers to each other, friends to each other, kins to each other, etc.) and/or to connect the two users if the two users agree to be connected (e.g., through accepting an invitation to connect and/or to form a sub-society). The invitation module 306 may be used to invite an unregistered user when the unregistered user is invited by a registered user and/or to invite another registered user when the another registered user matches with an attribute data entered by the registered user.

The community database 308 may be a collection of data (e.g., in a flat model, a hierarchical model, a network model, a relational model, a dimensional model, and/or an object database model) associated with a formation of a network (e.g. the beverage society 104). The profile data 310 may be personal information about the users 124, such as an age, a gender, a name, an email address, a password, a hobby, a marital status, a date of birth, a physical address, and/or an occupation of the users 124. The attribute library 312 may include a set of attributes which may be selectively used by each of the beverage society 104. For instance, the beverage society 104 of wine may use a list of attributes which includes a year, a winery, a region, a climate, a barrel, a maker, a pairing food, a cost, a best occasion to consume, a gender, an occupation, an income, an age, an aroma, a taste, an after-taste, and/or a body.

The opinion data 314 may be obtained from the users 124 when the users 124 are being asked to react to one or more of a list of attributes of the attribute library 312. One example embodiment may be ratings of the users 124 when the users 124 are asked to rate a particular beverage. The membership data 316 may hold information of the users 124 in regards to their membership in a particular beverage society and/or clubs and/or groups of the particular beverage society. The membership data 316 may also hold information as to how each user connects to other users of the network 110.

Furthermore, a first registered user of the network 110 and a second registered user of the network 110 may be connected when a first opinion data (e.g., the opinion data 314) of the first registered user matches with a second opinion data of the second registered user beyond a threshold value (e.g., set by the administrator of the global beverage environment 102). A first profile data (e.g., the profile data 310) of the first registered user (e.g., of the users 124 of FIG. 1) may be communicated to the second registered user and a second profile data of the second registered user to the first registered user for display. One or more intrinsic quality (e.g. of the attribute library 312) may be one or more of a taste, an after-taste, a body, and an aroma when the beverage society 104 is associated with wine.

An invitation data may be communicated to an unregistered user acquainted by a registered user. Furthermore, the unregistered user may be added to a database (e.g., to the profile data 310 and the membership data 316 of the community database 308) of the network 110 through processing a new profile data of the unregistered user when the unregistered user communicates an acceptance data to the registered user. A set of attributes (e.g., of the attribute library 312) may include one or more of a year, a winery, a region, a climate, a barrel, a maker, a pairing food, a cost, a best occasion to consume, a gender, an occupation, an income, an age, an aroma, a taste, an after-taste, and/or a body when the beverage is a wine.

Figure 4:
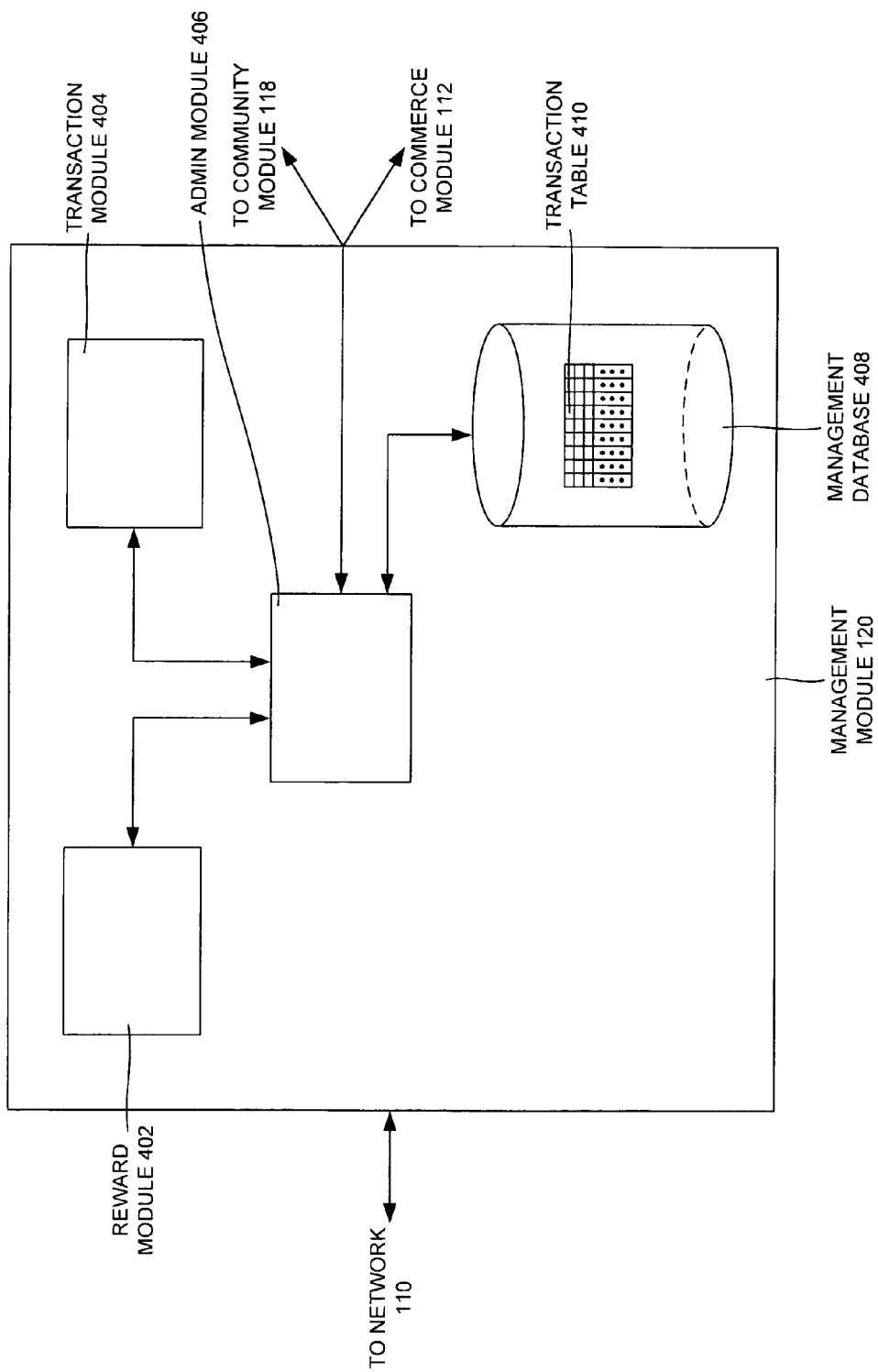
FIG. 4 is an exploded block diagram of the management module of FIG. 1, according to one embodiment.

FIG. 4 is an exploded block diagram of the management module 120 of FIG. 1, according to one embodiment. Particularly, in FIG. 4 illustrates a reward module 402, a transaction module 404, an admin module 406, a management database 408, and a transaction table 410. The reward module 402 may issue a coupon, a discount note, and/or other types of reward to the users 124 for participating in an event sponsored the beverage society 104 and/or for inviting an unregistered user to the beverage society 104.

The transaction module 404 may process (e.g., capture, track, record, communicate, store, monitor, analyze, etc.) financial data and/or meta-data associated with a transaction initiated by the users 124 through the beverage society 104. The transaction module 404 may process financial information associated with the users 124 who purchase an offering (s) (e.g., provided by vendors of the offering(s)) through the beverage society 104.

The admin module 406 may conduct an administrative function which may includes censoring of a contribution (e.g., of a graphic data and/or a text data) of the users 124, the vendors (e.g., of the vendor module 106), and advertises (e.g., of the advertiser module 108). The management database 408 may be a database management system and/or a collection of records stored in a computer in a systematic way. The collection of records may be presented as a transaction table 410 (e.g., a relational database) including names of the users 124, a product ID, a vendor name, a vendor code, a usage of coupon, and/or a total spending.

The transaction may be accessed by the vendors and/or the advertisers (e.g., at a fee) through the vendor module 106 and the advertiser module 108, respectively to selectively target a segment of the users 124 (e.g., thereby maximizing their marketing efforts). Furthermore, a financial reward may be provided to some of the users 124 when the some of the users 124 perform one or more of posting a blog related to a wine and wine-related products, rating the wine and the wine-related products, and/or inviting unregistered user to join the network (e.g., the beverage society 104).

Figure 5:
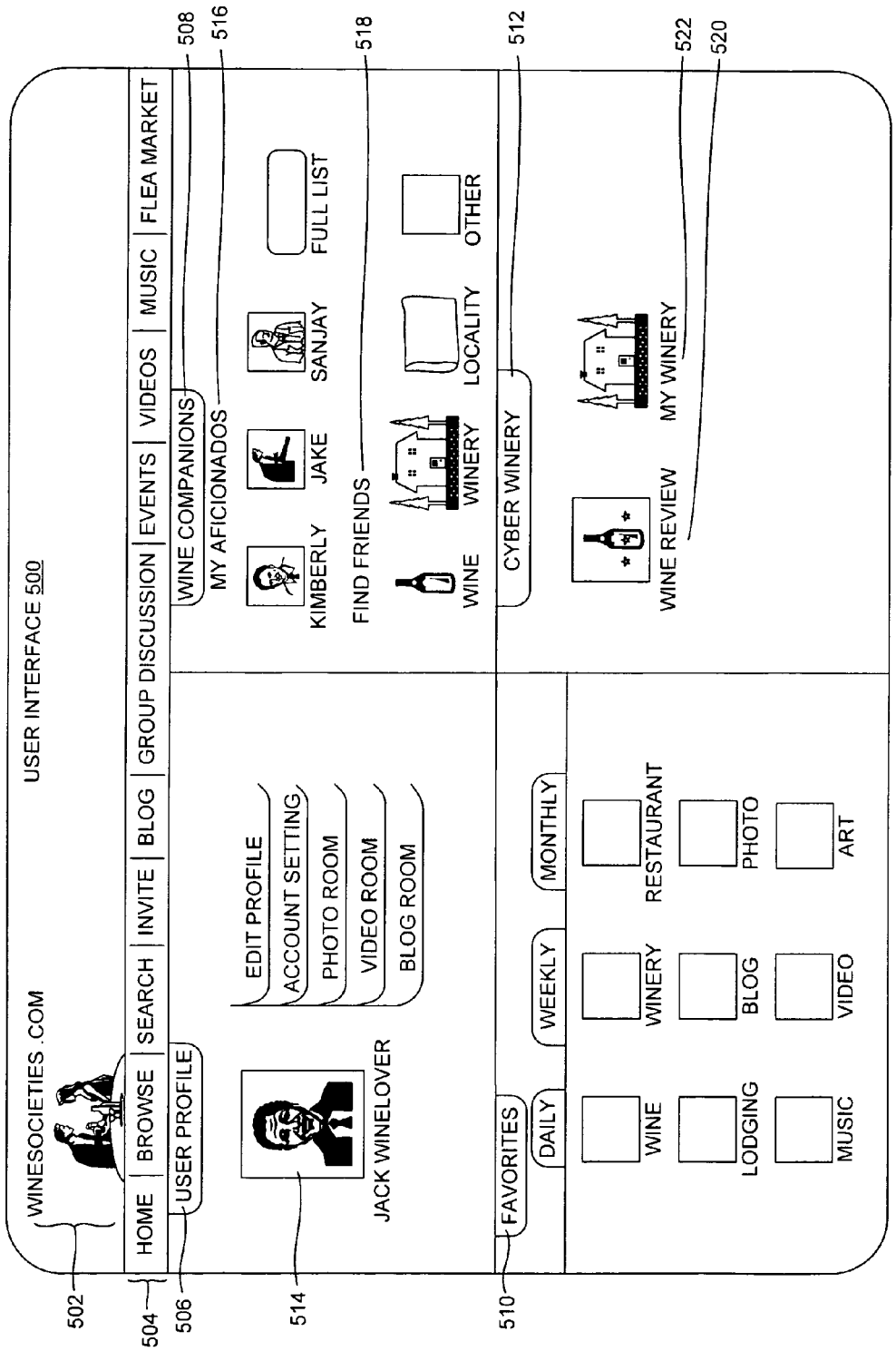
FIG. 5 is a graphical user interface of a beverage society, according to one embodiment.

FIG. 5 is a graphical user interface of the beverage society 104 of FIG. 1, according to one embodiment. Particularly, in FIG. 5 illustrates a user interface 500 having a logo 502, a menu bar 504, a user profile tab 506, a wine companions tab 508, a favorites tab 510, a cyber winery tab 512, a user profile view 514, a my aficionados view 516, a find friends view 518, a wine review 520, and a my winery 522.

The logo 502 may display a textual and/or graphic visualization (e.g., may be designed by a host) of the beverage society 104. The menu bar 504 may display features (e.g., such as a home, a browse, a search, an invite, a blog, a group discussion, events, videos, a music, and/or a flea market) available for the beverage society 104. The user profile tab 506, the wine companions tab 508, the favorites tab 510, and/or the cyber winery tab 512 may enable an individual user to move to a particular subsection (e.g., the user profile tab 506, the wine companions tab 508, the favorites tab 510, and/or the cyber winery tab 512) of the user interface 500.

The user profile view 514 may display information about an individual user who is registered with the beverage society 104. The user profile view 514 may feature an edit profile, an account setting, a photo room, a video room, and/or a blog room. The my aficionados view 516 may display a number of acquaintances who are accepted by the individual user for sharing a similar affinity toward a beverage of the beverage society 104 and/or for sharing similar interests in other areas. The find friends view 518 may be a search engine which enables the individual user to search other users (e.g., among the users 124) based on a search category (e.g., a wine, a winery, a locality, etc.) rendered by the beverage society 104.

The individual user may also access a favorite wine, a favorite winery, a favorite restaurant, a favorite lodging, a favorite blog, a favorite photo, a favorite music, a favorite video, and/or a favorite art (e.g., as displayed under the favorites tab 510) of a particular day, a particular week, and/or a particular month. The wine review 520 may enable the users 124 to react (e.g., taste, rate, review, comment, criticize, etc.) to a list of wines and/or participate (e.g., through an invitation and/or voluntarily) in an event to review a particular wine (e.g., for a reward and/or an incentive). The my winery 522 may enable the users 124 to educate themselves about a wine making process and other related activities and/or make a variation of wine through picking out a particular winery which may physically carry out a task of making the variation according to instructions of the users 124 (e.g., for a fee).

Furthermore, one or more products of a particular winery may be provided to the users 124 (e.g., where the products may include one or more of a wine list of a particular winery, a winery tour offered by the particular winery, and/or wine-related products offered by the particular winery).

Figure 6:
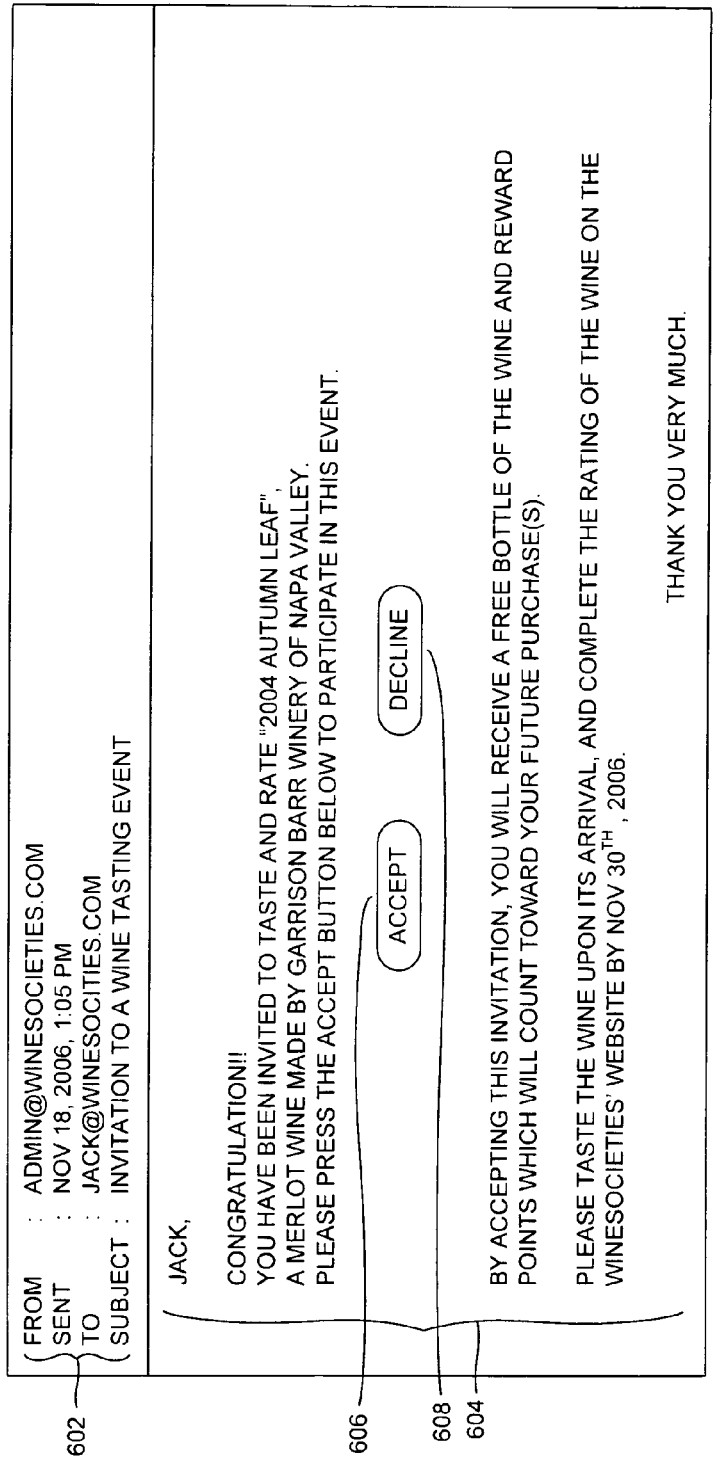
FIG. 6 is a user interface view of an electronic message associated with the valuation module of FIG. 1, according to one embodiment.

FIG. 6 is a user interface view of an electronic message associated with the valuation module of FIG. 1, according to one embodiment. Particularly, in FIG. 6 illustrates an electronic message 600, a header 602, a message text 604, an accept button 606, and a decline button 608. The header 602 may contain information of a sender, a receiver, a subject, and a date of the electronic message 600. The message text 604 may be used to urge a recipient (e.g., any of the users 124 of FIG. 1) to participate in a valuation of a beverage (e.g., and/or other products related to the beverage). The accept button 606 may initiate a valuation process of the beverage by the recipient (e.g., where the valuation process may include delivering the beverage to the recipient, assigning ratings of the users 124 to attributes of the beverage, and/or compensating the users 124 with award points for participation). The decline button 608 may communicate to a sender of the electronic message 600 that the users 124 may not be interested in participating in the valuation process. Furthermore, a variation of a particular type of beverage may be evaluated based on a different set of opinion data assigned by the users 124 of the network 110 using an incentive promoting the particular type of beverage to the users 124.

Figure 7:
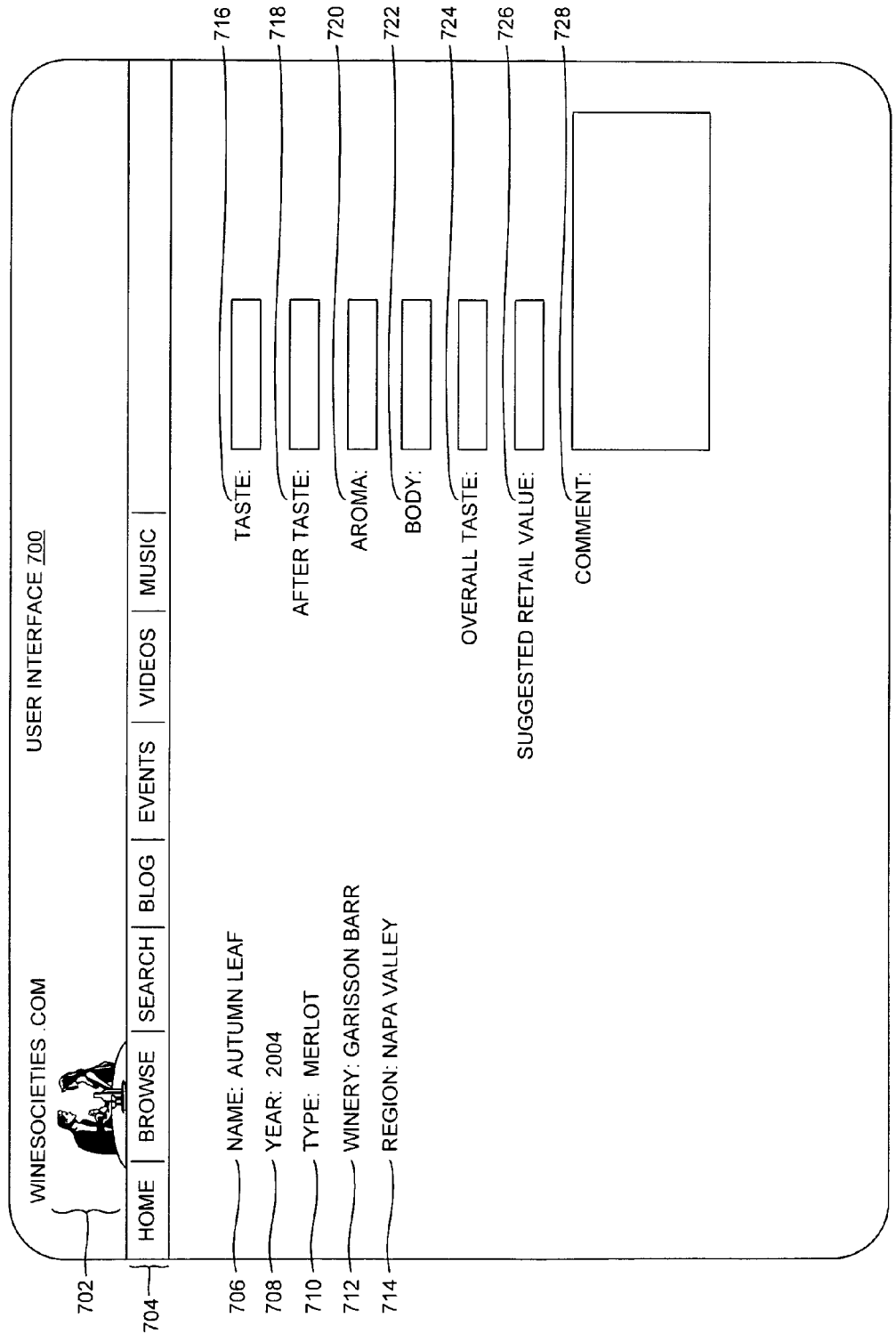
FIG. 7 is a user interface view of a valuation process associated with the valuation module of FIG. 1, according to one embodiment.

FIG. 7 is a user interface of a valuation process associated with the valuation module 114 of FIG. 1, according to one embodiment. Particularly, in FIG. 7 illustrates a user interface 700 having a logo view 702, a menu bar 704, a name 706, a year 708, a type 710, a winery 712, a region 714, a taste 716, an after-taste 718, an aroma 720, a body 722, an overall taste 724, a suggested retail value 726, and a comment 728.

The logo view 702 may display a textual and/or graphic visualization (e.g., may be designed by a host) of the beverage society 104. The menu bar 704 may display features (e.g., such as a home, a browse, a search, a blog, events, videos, and a music) available for the beverage society 104. The name 706, the year 708, the type 710, the winery 712, and the region 714 may be objective information that are displayed on the user interface 700 to inform the users 124 about the beverage being evaluated. For example, the objective information indicates that the beverage going through the valuation process is a Merlot wine named "Autumn Leaf" of year 2004 made by Garrison Barr Winery of Napa Valley.

On the other hand, the taste 716, the after-taste 718 (e.g., a finish), the aroma 720, the body 722, the overall taste 724, the suggested retail value 726, and the comment 728 may be subjective information which may be solicited from the users 124 in the valuation process. The taste 716, the after-taste 718, the aroma 720, the body 722, and the overall taste 724 may be entered by the users 124 in a percentage value. In another example, the users 124 may be instructed to select among numbers listed using a pull-down list next to the categories (e.g., the subjective information). The users 124 may enter the suggested retail value 726 of the beverage based on their valuation of the beverage (e.g., Autumn Leaf 2004) in dollars. The comment 728 may be entered by the users 124 to list other reactions of the users 124 about the beverage.

Figure 8A:
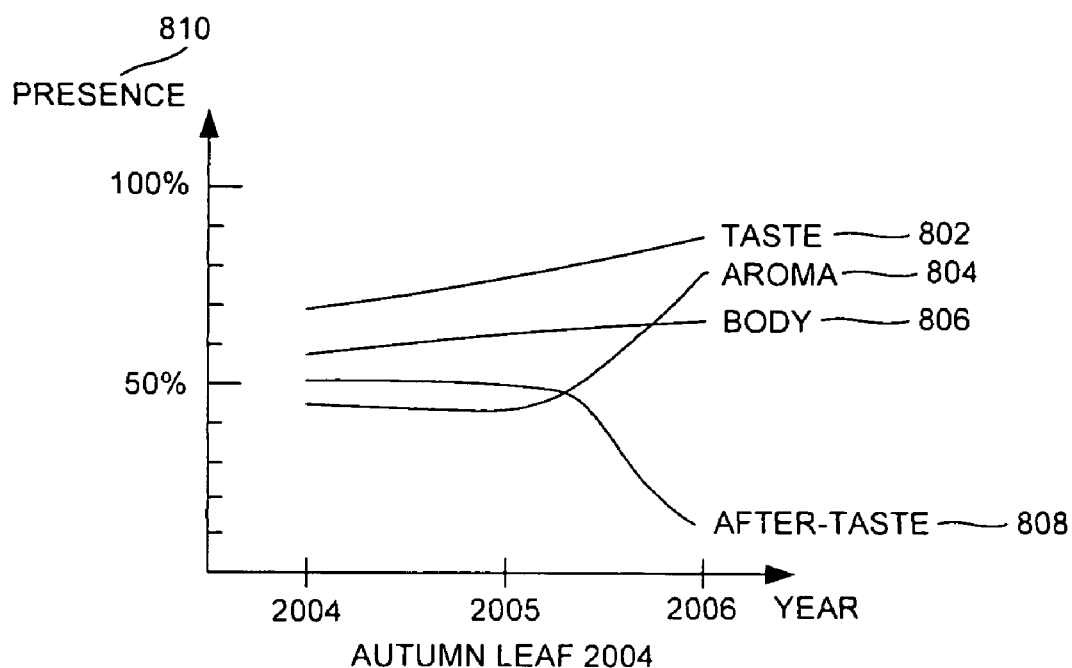
FIG. 8A is a graphical view of evaluation of four attributes of the beverage of FIG. 6, according to one embodiment.

FIG. 8A is a graphical view of evaluation of four attributes of the beverage of FIG. 6, according to one embodiment. Particularly, in FIG. 8A illustrates a taste 802, an aroma 804, a body 806, an aftertaste 808 and a presence 810 of the "Autumn Leaf 2004" of FIG. 6. FIG. 8A may display a quality of the "Autumn Leaf 2004" as the wine ages. For instance, the presence 810 of the taste 802, the aroma 804, and the body 806 of the wine is improving as the wine ages, whereas the presence 810 of the aftertaste 808 is decreasing as the wine ages.

Figure 8B:
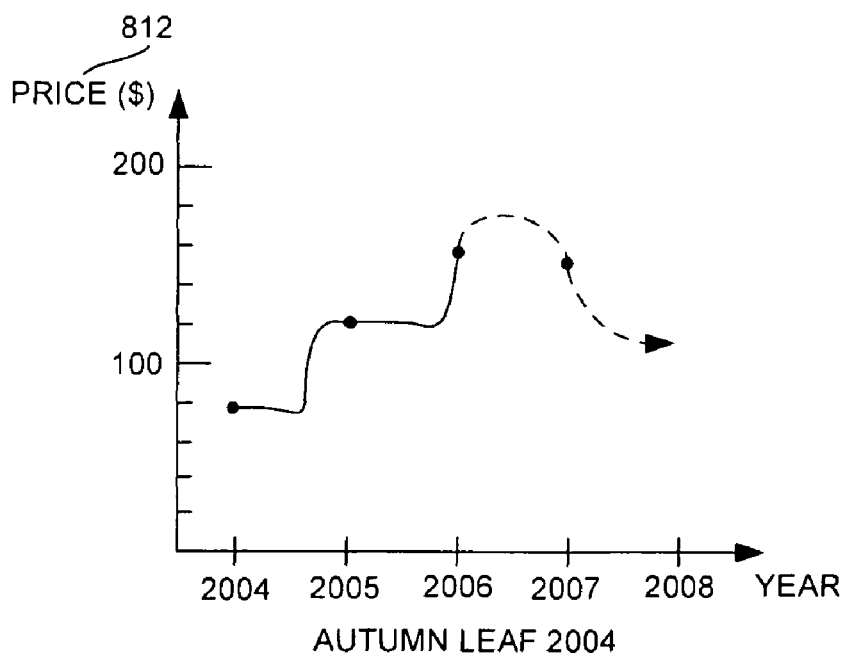
FIG. 8B is a graphical view of price projection of the beverage, according to one embodiment.

FIG. 8B is a graphical view of price projection of the beverage, according to one embodiment. Particularly, in FIG. 8B illustrates a price of the "Autumn Leaf 2004" (e.g., based on the opinion data 314 of FIG. 3 and/or other data such as transaction data of the "Autumn Leaf 2004") for a two year span between 2004 and 2006. FIG. 8B may also display a projected price of next two years starting 2006 (e.g., based on the opinion data 314 and/or other data such as the transaction data). FIG. 8B illustrates that price of the "Autumn Leaf 2004" has been steadily increasing for the past two years, but is expected to level off in the next two years. Furthermore, a consumption data of a wine may be rendered to the users 124 based on one or more of subjective attributes, such as an aroma, a taste, an aftertaste, a body, and other qualities of the wine and/or based on one or more objective attributes of the wine, such as the age, region, the maker of the wine and/or the age, gender, income level, and/or ethnicity of the users 124.

Figure 9:
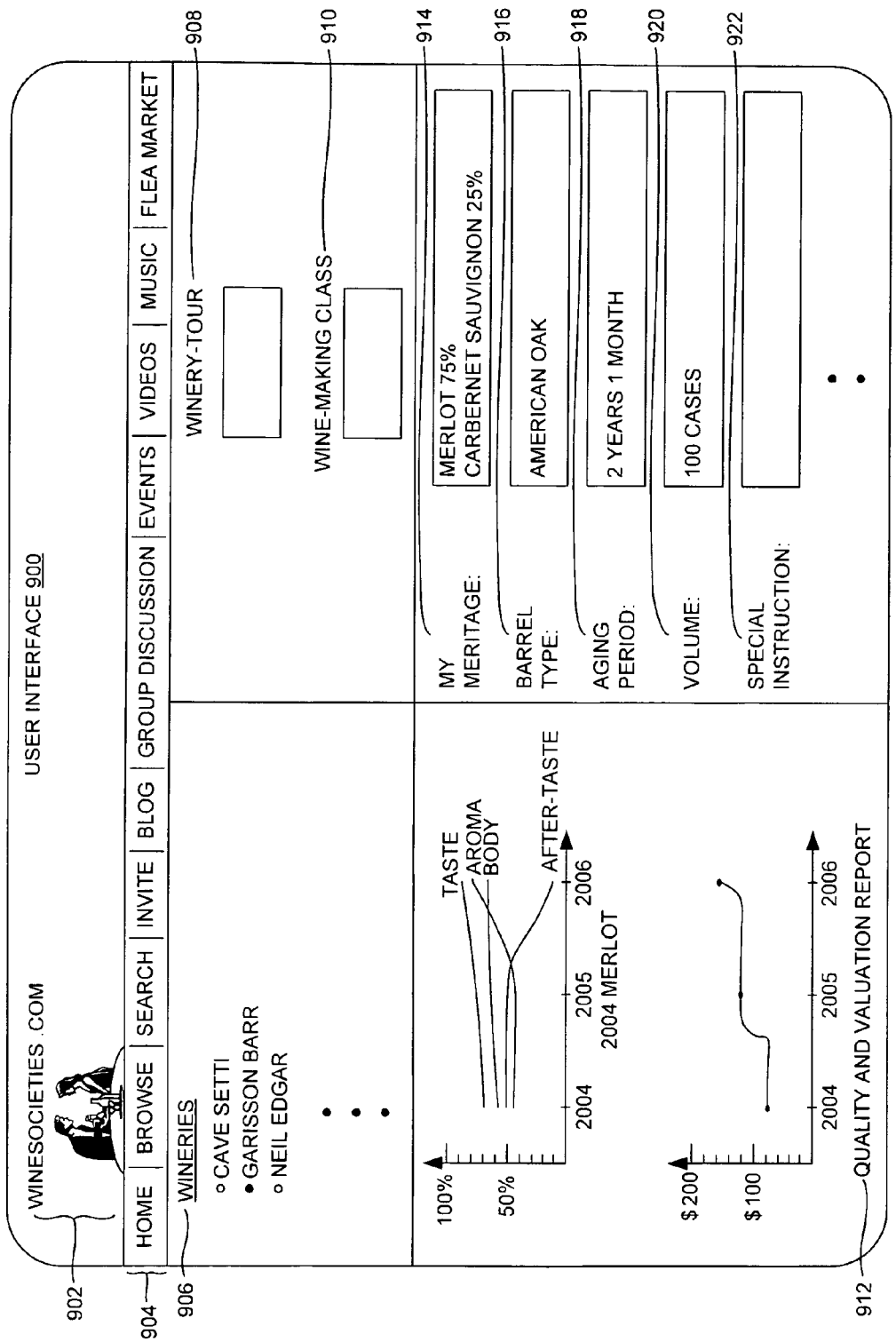
FIG. 9 is a graphical user interface view of an offering of the beverage society of FIG. 5 in regards to a concoction of a variation of a particular type of beverage, according to one embodiment.

FIG. 9 is a graphical user interface view of an offering of the beverage society of FIG. 5 in regards to a concoction of a variation of a particular type of beverage, according to one embodiment.

Particularly, in FIG. 9 illustrates a user interface 900 which includes a logo 902, a menu bar 904, wineries 906, a winery-tour 908, a wine-making class 910, a quality and valuation report 912, a my meritage 914, a barrel type 916, an aging period 918, a volume 920, and/or a special instruction 922. The logo 902 may display a textual and/or graphic visualization (e.g., may be designed by a host of the beverage society 104). The menu bar 904 may display features (e.g., such as a home, a browse, a search, a blog, a group discussion, events, videos, a music, and a plea market) available for the beverage society 104.

The wineries 906 may list names of wineries which collaborate with any one of the users 124 to enable the any one of the users 124 to make a wine of their choice. The winery-tour 908 may provide information about the wineries 906 (e.g., through videos, pictures, and/or description about the wineries 906) to the users 124 so as to provide a look and feel of the wineries to the users 124. The wine-making class 910 (e.g., in videos, presentation slides, etc.) may be used to educate the users 124 to enable them to make a wine of their choice. The quality and valuation report 912 may display a report (e.g., in graphic, text, etc.) of a particular type of beverage (e.g., 2004 Merlot) based on an inquiry of the users 124.

The my meritage 914 may be entered by the users 124 based on a meritage that is chosen by the users 124. In this example, the meritage is concocted with 75% of merlot and 25% of Carbernet Sauvignon. The barrel type 916 which may be used to age the maritage may be entered by the users 124. The aging period 918 which may be a length of time to age the meritage may be entered by the users 124. The volume 920 which may be a number of cases and/or bottles being ordered may be entered by the users 124. Also, the special instruction 922 may be entered by the users 124.

Furthermore, a formula data may be generated to enable a registered user to concoct a variation of the particular type of beverage accentuating the at least one intrinsic quality of the particular type of beverage. An instruction data (e.g., the instruction data 208 of FIG. 2) may be rendered to the registered user as to how to concoct the type of wine, wherein the instruction data to include at least one of mixing different types of wine at a choosing of the registered user to make a meritage, deciding how long to age the meritage, and selecting an environment to store the meritage. Also, the registered user may be connected with the particular winery to concoct the variation of the type of wine at the particular winery based on a customized instruction data of the registered user.

Figure 10:
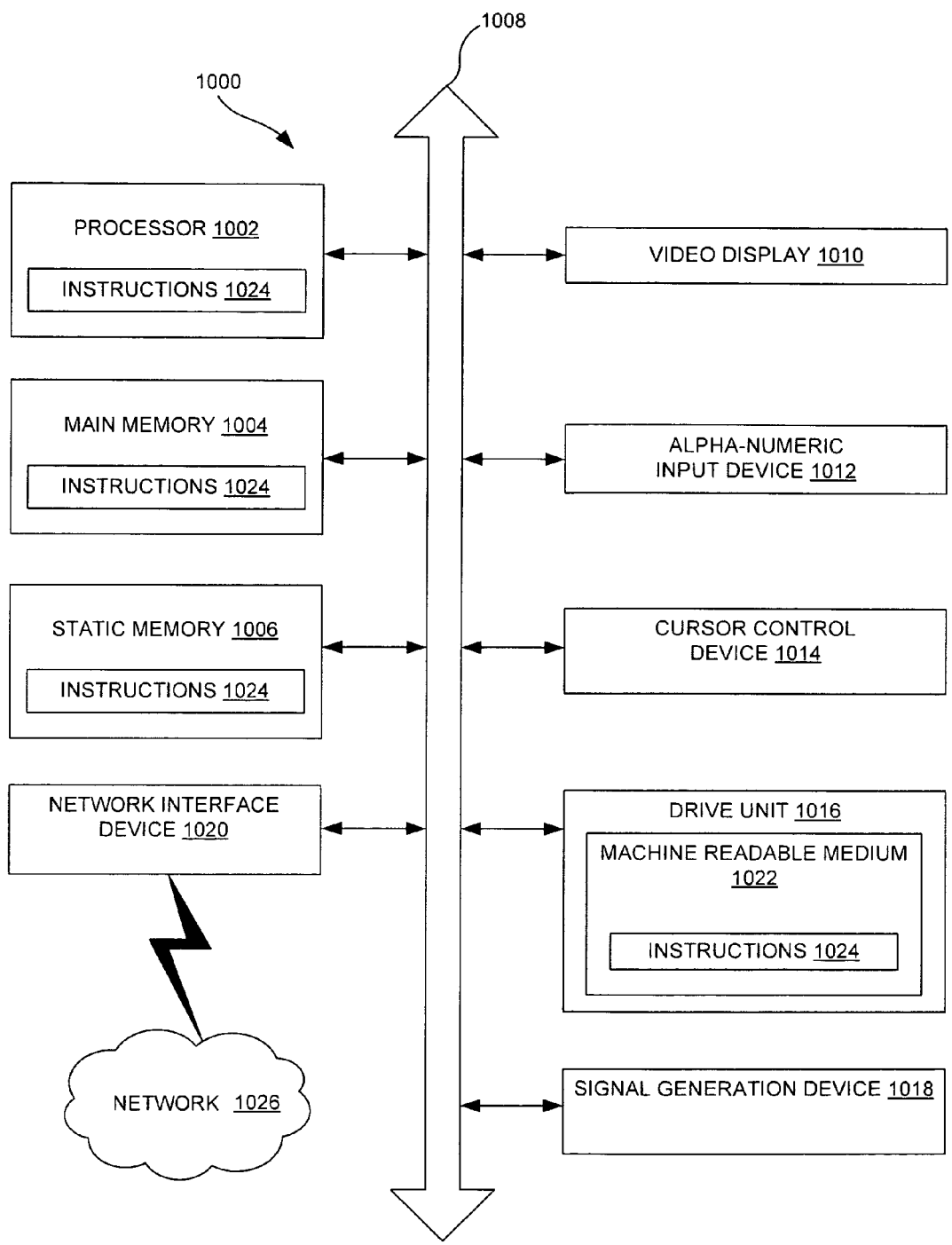
FIG. 10 is a diagrammatic representation of a data processing system capable of processing a set of instructions to perform any one or more of the methodologies herein, according to one embodiment.

FIG. 10 is a diagrammatic representation of a data processing system capable of processing a set of instructions to perform any one or more of the methodologies herein, according to one embodiment. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment.

The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 1000 includes a processor 1002 (e.g., a central processing unit (CPU) a graphics processing unit (GPU) and/or both), a main memory 1004 and a static memory 1006, which communicate with each other via a bus 1008. The computer system 1000 may further include a video display unit 1010 (e.g., a liquid crystal display (LCD) and/or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies and/or functions described herein. The software 1024 may also reside, completely and/or at least partially, within the main memory 1004 and/or within the processor 1002 during execution thereof by the computer system 1000, the main memory 1004 and the processor 1002 also constituting machine-readable media.

The software 1024 may further be transmitted and/or received over a network 1026 via the network interface device 1020. While the machine-readable medium 1022 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, and optical and magnetic media.

Figure 11:
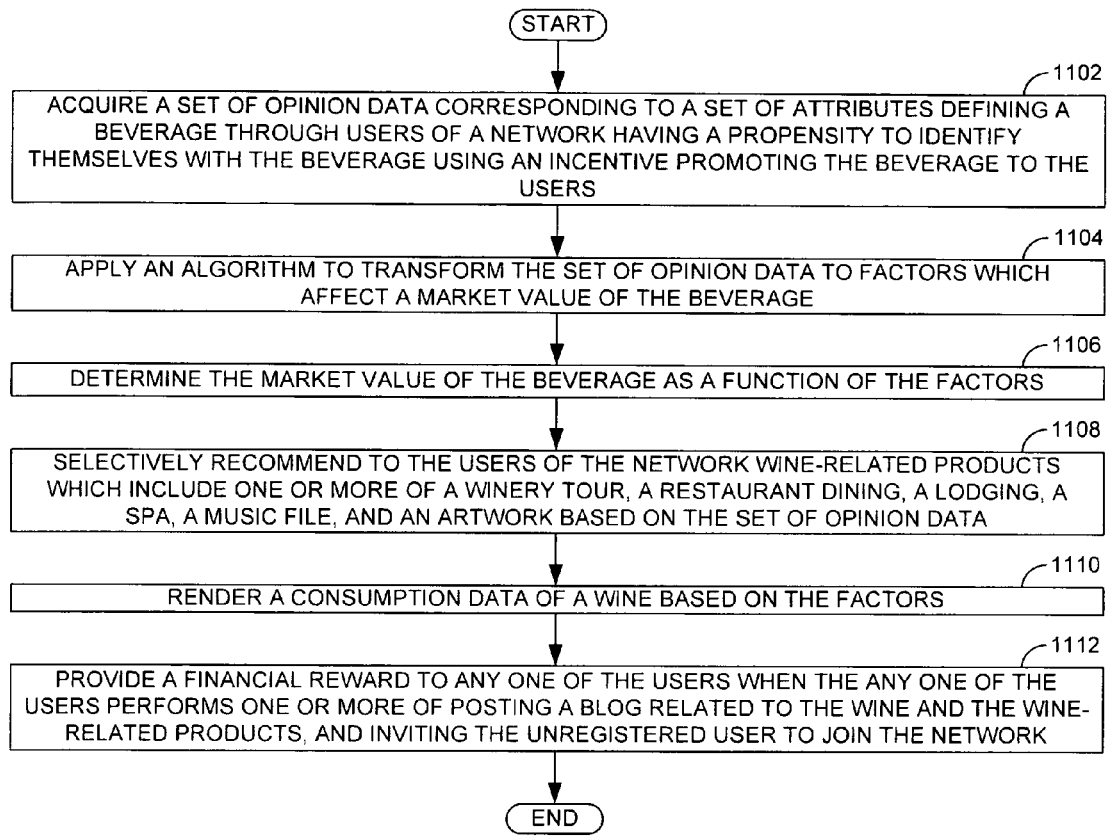
FIG. 11 is a process flow to determine a market value of a beverage defined by the beverage society of FIG. 1, according to one embodiment.

FIG. 11 is a process flow to determine a market value of a beverage defined by the beverage society 104 of FIG. 1, according to one embodiment. In operation 1102, a set of opinion data (e.g., the opinion data 314 of FIG. 3) may be acquired corresponding to a set of attributes defining a beverage through users (e.g., the users 124 of FIG. 1) of a network (e.g., the beverage society 104) having a propensity to identify themselves with the beverage using an incentive promoting the beverage to the users. In operation 1104, an algorithm (e.g., the estimation algorithm 206 of FIG. 2) may be applied to transform the set of opinion data to factors which affect a market value of the beverage.

In operation 1106, the market value of the beverage may be determined as a function of the factors. In operation 1108, wine-related products which include one of more of a winery tour, a restaurant dining, a food pairing, a lodging, a spa, a music file, and an artwork may be selectively recommend to the users of the network based on the set of opinion data. In operation 1110, a consumption data of the wine may be rendered based on the factors. In operation 1112, a financial reward may be provided to any one of the users when the any one of the users performs one or more of posting a blog related to the wine and the wine-related products, rating the wine and the wine-related products, and inviting the unregistered user to join the network.

Figure 12:
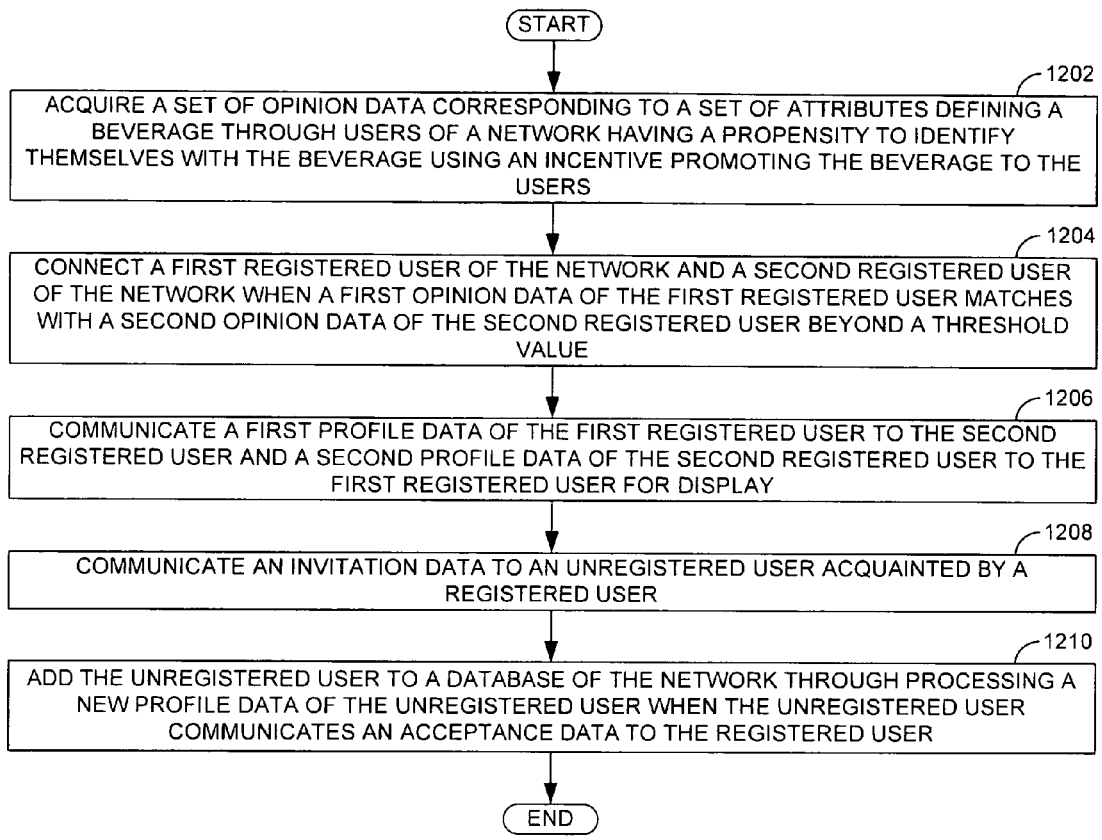
FIG. 12 is a process flow to connect a first registered user of the network and a second registered user of the network sharing a similar opinion about the beverage, according to one embodiment.

FIG. 12 is a process flow to connect a first registered user of the network and a second registered user of the network sharing a similar opinion about the beverage, according to one embodiment.

In operation 1202, a set of opinion data corresponding to a set of attributes (e.g., of the attribute library 312 of FIG. 3) defining a beverage may be acquired through users of a network having a propensity to identify themselves with the beverage using an incentive promoting the beverage to the users. In operation 1204, a first registered user of the network and a second registered user of the network may be connected when a first opinion data of the first registered user matches with a second opinion data of the second registered user beyond a threshold value (e.g., which may be set by an administrator of the global beverage environment 102 of FIG. 1).

In operation 1206, a first profile data of the first registered user may be communicated to the second registered user and a second profile data of the second registered user to the first registered user for display. In operation 1208, an invitation data may be communicated to an unregistered user acquainted by a registered user. In operation 1210, the unregistered user may be added to a database of the network through processing a new profile data of the unregistered user when the unregistered user communicates an acceptance data to the registered user.

Figure 13:
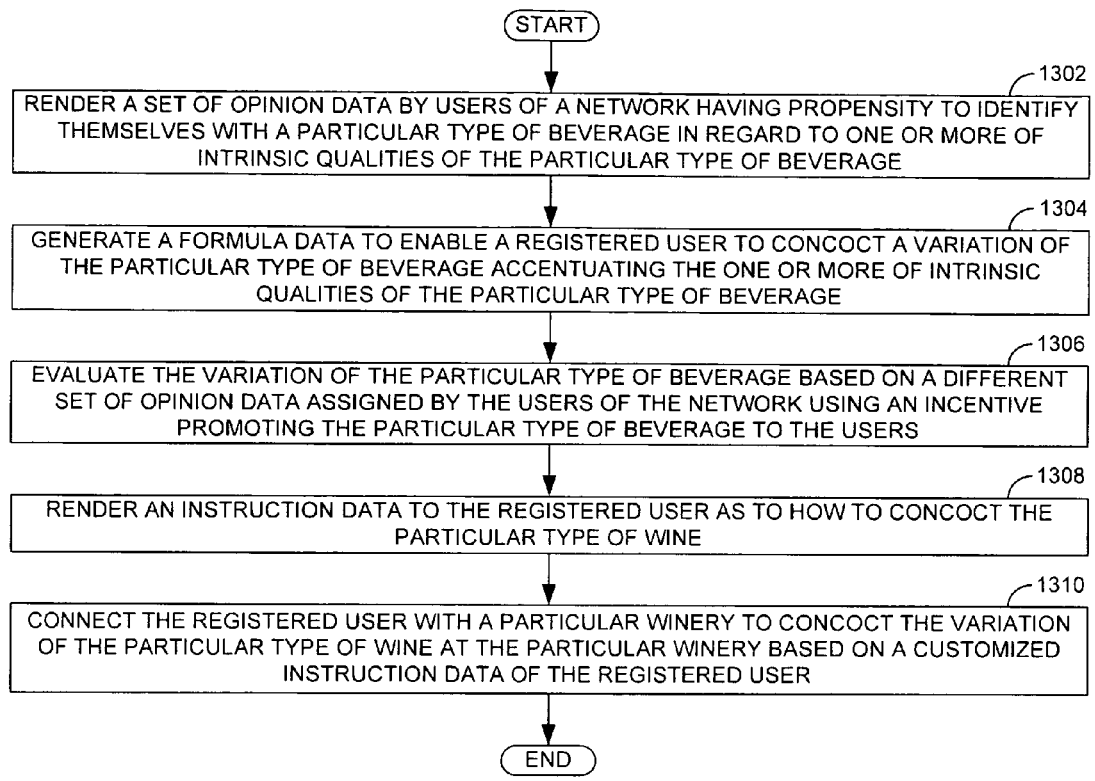
FIG. 13 is a process flow to generate a formula data to enable a registered user to concoct a variation of a particular type of the beverage, according to one embodiment.

FIG. 13 is a process flow to generate a formula data to enable a registered user to concoct a variation of a particular type of the beverage, according to one embodiment. In operation 1302, a set of opinion data by users of a network having a propensity to identify themselves with a particular type of beverage in regard to one or more of intrinsic qualities of the particular type of beverage may be rendered to a registered user. In operation 1304, a formula data may be generated to enable a registered user to concoct a variation of the particular type of beverage accentuating the one or more of intrinsic qualities of the particular type of beverage.

In operation 1306, the variation of the particular type of beverage may be evaluated based on a different set of opinion data assigned by the users of the network using an incentive promoting the particular type of beverage to the users. In operation 1308, an instruction data may be rendered to the registered user as to how to concoct the particular type of wine. In operation 1310, the registered user may be connected with a particular winery to concoct the variation of the particular type of wine at the particular winery based on a customized instruction data of the registered user.

Although the present embodiments have been described with reference to specific example embodiments, it will be evident that various modifications and changes may be made to these embodiments without departing from the broader spirit and scope of the various embodiments. For example, the various devices, modules, engines, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the vendor module 106, the advertiser module 108, the commerce module 112, the valuation module 114, the collaboration module 116, the community module 118, and/or the management module 120 of FIG. 1, the incentive module 202, the presentation module 204, and/or the processor module 210 of FIG. 2, the search module 302, the relationship module 304, and/or the invitation module 306 of FIG. 3, the reward module 402, the transaction module 404, and/or the admin module 406 of FIG. 4 may be enabled using transistors, logic gates, and electrical circuits (e.g., application specific integrated ASIC circuitry) using a vendor circuit, an advertiser circuit, a commerce circuit, a valuation circuit, a collaboration circuit, a community circuit, a management circuit, an incentive circuit, a presentation circuit, a processor circuit, a search circuit, a relationship circuit, an invitation circuit, a reward circuit, a transaction circuit, and/or an admin circuit.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method, comprising:
   based on an incentive promoting a wine to a plurality of users of a network, acquiring opinion data from the plurality of users, the opinion data relating to a set of attributes defining the wine, the set of attributes including a year, a winery, a region, a climate, a barrel, a maker, a pairing food, a cost, a suggested retail price, a best occasion to consume, an age, an aroma, a taste, an aftertaste, and a body, the aroma, the body, and the after taste being intrinsic qualities;
   applying an algorithm through the processor to estimate a future price of the wine based on the opinion data,
      the applying of the algorithm including processing the opinion data relating to the suggested retail price for the wine together with the opinion data relating to the intrinsic qualities of the wine;
   applying the algorithm to estimate another future price based on further opinion data, the further opinion data relating to the intrinsic qualities of a variation of the wine, the other future price being an estimation of the future price of the variation of the wine, the variation of the wine accentuating at least one of the intrinsic qualities of the wine;
   connecting a first registered user of the plurality of users of the network and a second registered user of the plurality of users of the network when a first opinion data, of the opinion data, provided by the first registered user matches, beyond a threshold value, with a second opinion data, of the opinion data, provided by a second registered user, the connecting of the first registered user and the second registered user including
      communicating a first profile data of the first registered user to the second registered user for display, and communicating a second profile data of the second registered user to the first registered user for display;
   communicating an invitation data to an unregistered user acquainted to the network by another registered user of the plurality of users;
   adding the unregistered user to a database of the network through processing a new profile data of the unregistered user when the unregistered user communicates an acceptance data to the registered user;
   selectively recommending, based on the opinion data, wine related products to the plurality of users of the network, the wine-related products at least including a winery tour, a restaurant dining, a food pairing, a travel region, a lodging, a spa, a music file, and an artwork;

generating a consumption data of the wine based on at least one of the set of attributes; and providing a financial reward to any one of the plurality of users when the any one of the plurality of users performs at least one of posting a blog related to the wine and the wine-related products, rating the wine and the wine-related products, and inviting the unregistered user to join the network.

\* \* \* \* \*